United States Patent Office 3,830,725
Patented Aug. 20, 1974

3,830,725
CRACKING HYDROCARBONS WITH CATALYSTS CONTAINING NICKEL AND MAGNESIUM EXCHANGED ZEOLITES
Geoffrey E. Dolbear, Columbia, and John S. Magee, Jr., Baltimore, Md., assignors to W. R. Grace & Co., New York, N.Y.
No Drawing. Original application Dec. 23, 1970, Ser. No. 101,099, now abandoned. Divided and this application May 24, 1972, Ser. No. 256,608
Int. Cl. B01j 9/20; C01b 33/28; C10g 11/18
U.S. Cl. 208—120                                      6 Claims

ABSTRACT OF THE DISCLOSURE

Z-14 US zeolite promoters for hydrocarbon cracking catalysts are exchanged with a combination of nickel and magnesium ions and subsequently calcined. Cracking catalysts containing these zeolites are found to possess increased selectivity for the production of aromatic gasolines having increased non-leaded octane ratings. Furthermore, the nickel and magnesium exchanged Z-14 US zeolite may be advantageously combined with rare earth exchanged faujasite containing catalysts.

RELATED APPLICATIONS

This application is a divisional of Ser. No. 101,099, filed Dec. 23, 1970, now abandoned and continued as Ser. No. 273,898, filed July 21, 1972.

The present invention relates to hydrocarbon conversion catalysts, and more specifically to hydrocarbon cracking catalyst which are capable of producing gasoline fractions of increased aromatic content and higher non-leaded octane rating.

It is well known that zeolite promoted hydrocarbon cracking catalysts are capable of producing good yields of gasoline fractions from gas oils. Commercial cracking catalysts containing hydrogen and/or rare earth exchanged faujasite have been found to be particularly active and selective for the production of gasoline in conventional hydrocarbon cracking operations.

It is frequently found, however, that the non-leaded octane rating of gasolines produced by conventional zeolite promoted catalysts are not particularly high. It is well recognized that a catalyst which is capable of producing a high level of aromatic type gasoline fractions will substantially improve the octane rating of non-leaded cracker gasoline, and accordingly will enhance the value of the gasoline produced using conventional cat-cracking plant facilities.

It is therefore an object of the present invention to provide an improved zeolite for use as a hydrocarbon cracking catalyst.

It is a further object to provide a zeolite promoted hydrocarbon conversion catalyst composition which is particularly selective for the production of aromatic containing gasoline fractions from conventional cracker feedstocks.

It is another object to provide a method for cracking gas oil feedstocks in conventional catalytic conversion plant facilities to provide gasoline of high unleaded octane rating.

These and still further objects of the present invention will become readily apparent to one skilled in the art from the following detailed description and specific examples.

Broadly, our invention contemplates a zeolite catalyst composition which comprises nickel-magnesium exchanged Z-14 US zeolite, hereinafter frequently referred to as Ni-Mg Z-14 US, and in one particularly preferred embodiment, Ni-Mg Z-14 US in combination with rare earth exchanged faujasite.

More specifically, we have found that when conventional petroleum gas oil feedstocks are subjected to catalytic cracking in the presence of zeolite catalyst which comprises a nickel-magnesium exchanged Z-1r US zeolite, and optionally rare earth exchanged faujasite, gasoline fractions are obtained which contain a particularly high proportion of aromatic components. These gasoline fractions exhibit a high non-leaded octane rating.

The nickel-magnesium exchanged faujasite utilized in the preparation of the present catalyst compositions are obtained by exchanging a modified synthetic faujasite known as Z-14 US with nickel-magnesium ions under specific conditions. The finished Z-14 US nickel-magnesium exchanged faujasite will contain from about .01 to 3.00 by weight percent nickel ion and from about .01 to 3.00 by weight percent magnesium ion, expressed in terms of nickel and magnesium oxides.

The method employed in preparing the present contemplated nickel-magnesium faujasite involves contacting a type Z-14 US zeolite, such as is disclosed in U.S. Pats. 3,293,192 and 3,449,070 to P. K. Maher et al., with a solution containing a mixture of soluble nickel, and magnesium salts, preferably nickel and magnesium chloride. The exchange solution will contain from about 0.1 to 2.0 moles per liter of nickel ion and from about 0.1 to 2.0 moles per liter of magnesium ion. It is generally found that a satisfactory exchange takes place when from about 1 to 10 liters of the above-defined nickel-magnesium ion solution are exchanged with each kilogram of Z-14 US zeolite. The exchange preferably takes place at a temperature of from about 30 to 100° C., and normally will take from about 10 to 60 minutes to obtain the desired concentration of nickel and magnesium ion.

Subsequent to the nickel-magnesium ion exchange the Z-14 US zeolite is washed free of soluble anion (Cl-, $SO_4^=$, etc.) and subjected to a calcination, i.e. heating step, at a temperature of from about 750 to 1500° F. and preferably about 1400° F. Calcination is conducted over a period of 1 to 5 hours.

The finished exchanged-calcined Z-14 US zeolite possesses a surface area on the order of from about 300 to 600 meters square per gram. The nickel magnesium product is sufficiently stable to withstand heating at temperatures on the order of 1000 to 1650° F. for periods of 1 to 5 hours. A typical sample subsequent to heating at 1650° F. for 3 hours is found to retain at least 75 percent of the initial surface area.

The present nickel-magnesium zeolite may be utilized as a catalyst per se. Preferably, however, the zeolite is combined with an inorganic matrix composition in amounts ranging from about 5 to 20 percent by weight of the total composition. The inorganic matrix component may comprise conventional amorphous silica-alumina hydrogels, silica, alumina, and/or natural or chemically/thermally modified clay, such as kaolin and metakaolin. The particularly preferred matrix is obtained by combining from about 50 to 100 percent by weight synthetic silica-alumina hydrogel, which contains on the order of 10 to 30 percent by weight alumina, with from about 0 to 50 percent by weight kaolin.

The preparation of catalyst compositions which contain the present nickel-magnesium zeolite involves incorporating the exchange zeolite in amounts ranging from about 5 to 20 percent by weight with the matrixes described above, and subsequently forming the compositions into particulate products suitable for catalytic applications. Accordingly, the present compositions may be formed into relatively large particles having a diameter on the order of 1/16 to 1/4 inches which are used in moving bed cat-cracking operations. Also, the present compositions may be prepared in the form of microspheres having diameters on the order of 50 to 200 microns which find application in the operation of fluidized cat-cracking units.

It is also found that the present nickel-magnesium exchanged Z-14 US zeolite may be advantageously combined with a conventional rare earth exchanged faujasite. The preparation of preferred calcined rare earth exchanged faujasites of both the X, i.e. CREX, and Y types, i.e. CREY, is fully disclosed in U.S. Pat. 3,402,996 to Maher et al.

When nickel-magnesium Z-14 US is combined with CREX and/or CREY, from about 0.5 to 2 parts by weight of CREX and/or CREX is preferably combined with each part by weight Ni-Mg Z-14 US. Catalyst which contain both Ni-Mg Z-14 US and CREX and/or CREY in combination with a matrix are preferably prepared as outlined above with both zeolite promoters being added at the same point in the catalyst preparation procedure in amounts ranging from about 10 to 20% by weight combined zeolite. Alternatively, the present Ni-Mg Z-14 US zeolite may be physically admixed with a conventional commercially obtainable CREX or CREY containing cracking catalyst. Suitable commercial catalyst compositions contain from about 5 to 25% by CREX or CREX combined with an inorganic matrix. The inorganic matrix of commercial catalyst typically comprises a silica-alumina hydrogel which contains 10 to 30% by weight alumina, either alone or in combination with clay 20 to 50% by weight, such as kaolin. The clay component is present in amounts ranging from 0 to about 50% by weight of the finished catalyst.

The present catalytic compositions exhibit good cracking activity as evidenced by conversion factors ranging from about 60 to 90 percent using normal cat-cracking conditions. Furthermore, the present catalysts exhibit excellent selectivity for the formation of aromatic containing gasoline fractions. As will be shown in the subsequent examples cracked gas oil products obtained through the use of the present catalyst contain an enhanced amount of aromatic components as evidenced by the presence of increased amounts of aromatic hydrogen.

The analytical method utilized in detecting the aromatic content of the present cracked gas oils involves nuclear magnetic resonance (NMR) techniques wherein the percentage of aromatic hydrogen is quickly and efficiently determined. It is generally known that the non-leaded octane rating of such cracker gasolines is correlatable to aromatic content.

Having described the basic aspects of the present invention, the following examples are given to illustrate specific embodiments thereof.

EXAMPLE I

Samples of nickel-magnesium exchanged Z-14 US type zeolite containing varying amounts of nickel magnesium ion were prepared as follows:

A Z-14 US zeolite was first prepared by exchanging a synthetic Y type sodium faujasite (NaY) having a silica to alumina ratio of 5.4, with ammonium sulfate solution to reduce the soda level thereof to about 3 weight percent. The ammonium exchanged faujasite was then calcined at a temperature of about 1000° F. for 3 hours, and subsequently exchanged with ammonium sulfate solution to reduce the soda level to about 0.3 percent by weight. The ammonium sulfate exchanged solutions utilized in the above exchanges contained 10 grams ammonium sulfate per liter of water and the exchanges were conducted at a temperature of 100° C. over a period of about 30 to 60 minutes.

The above Z-14 US type zeolite was then exchanged with aqueous solutions of nickel and magnesium chlorides. A comparison sample was exchanged with cobalt. The solutions contained varying ratios and amounts of nickel chloride, magnesium chloride, and cobalt acetate as indicated in the table below. The exchanges were conducted at 140° C. for about 30 minutes, the promoter 4 was exchanged twice, after which the exchanged faujasites were washed free of chloride withe deionized water, and finally calcined at 1400° F. for about 3 hours.

| Zeolite sample number | Exchange soln. (g./l.) | | | Zeolite metal ion composition (wt. percent) | | |
|---|---|---|---|---|---|---|
| | $NiCl_2$ | $MgCl_2$ | $CO(CH_3CO)_2$ | NiO | MgO | CoO |
| 1 | 14.2 | 10.3 | | 1.20 | 1.40 | |
| 2 | 9.6 | 13.9 | | 0.67 | 1.80 | |
| 3 | | | 17.8 | | | 5.40 |
| 4 | | | 71.1 | | | 6.54 |

EXAMPLE II

The nickel-magnesium and cobalt Z-14 US samples of Example I were incorporated in a semi-synthetic cracking catalyst matrix which comprised one part by weight kaolin clay, 2 parts by weight silica-alumina hydrogel which contained 25 percent alumina. The composition contained 1 part by weight exchanged Z-14 US to 9 parts by weight matrix. The catalyst compositions were formed into pills having a diameter of about ⅛ inches, and steamed 8 hours at 1350° F. with 15 p.s.i.g. steam. The steamed catalysts were then tested for activity in a conventional microactivity test unit using a gas oil fraction having a boiling range of 500 to 775° F. The microactivity test was conducted at a temperature of 920° F. at a weight hourly space velocity of 4.4 and catalyst to oil ratio of 5.8 to 1. The resulting cracked gas oil was analyzed for aromatic proton composition using NMR (nuclear magnetic resonance) techniques.

As shown in Table II below, it seen that the catalyst compositions containing the present nickel-magnesium exchanged faujasite promotes the formation of substantially more aromatic product than similar products which contained a similar metal, i.e. cobalt.

TABLE II

| Catalyst sample number | Zeolite promoter of Table I | Conversion, volume percent | Aromatic proton content, percent |
|---|---|---|---|
| 1 | (1) | 58 | 13.1 |
| 2 | (2) | 60 | 12.1 |
| 3 | (3) | 57 | 10.4 |
| 4 | (4) | 60 | 10.8 |

EXAMPLE III

A sample of Ni-Mg Z-14 US which contained 1.35% by weight NiO and 1.30% by weight MgO, was prepared by way of the procedure set forth in Example I. A sample of calcined rare earth exchanged type Y zeolite (CREY) was prepared by exhanging a synthetic faujasite having a silica to alumina ratio of 4.5 with aqueous rare earth chloride solution to obtain a rare earth exchange zeolite, i.e. REY, having a rare earth content of 16% by weight $RE_2O_3$. The REY was calcined for 3 hours at 1000° F., and subsequently exchanged with aqueous ammonium sulfate solution to reduce the $Na_2O$ level of the CREY to 0.3% by weight.

The Ni-Mg Z-14 US and CREY zeolites prepared above were combined in various combinations with a semi-synthetic matrix which comprised 2 parts by weight silica-alumina hydrogel (25% by weight alumina; 75% by weight silica) and 1 part kaolin clay. The resultant catalyst compositions were formed into ⅛ pills which were steamed 8 hours at 1350° F. with 15 p.s.i.g. steam. The catalytic activity of these catalysts was determined in the manner described in Example II. The result of a series of runs is tabulated in Table III below.

TABLE III

| Sample number | Ni-Mg Z-14 US wt. percent | CREY, wt. percent | Conversion, vol. percent | Coke, wt. percent | Aromatic H, wt. percent |
|---|---|---|---|---|---|
| 1 | 10 | 0 | 62.0 | 1.9 | 13.6 |
| 2 | 0 | 4 | 68.2 | 1.9 | 12.5 |
| 3 | 9 | 4 | 68.0 | 1.7 | 19.5 |

The above examples clearly indicate that catalytic cracking catalysts having superior selectivity for the production of aromatic gasoline fractions may be prepared using the teachings of our present invention.

We claim:

1. A method for catalytically cracking hydrocarbons to product gasoline fractions having high aromatic content which comprises contacting the hydrocarbon feedstock under catalytic cracking conditions, in the absence of added hydrogen, with a catalyst which comprises nickel-magnesium exchanged Z-14 US zeolite wherein said Z-14 US zeolite is characterized by stability to temperatures in excess of 1600° F.

2. The method of Claim 1 wherein said zeolite contains from about .05 to 3.0 percent nickel and .05 to 3.0 percent magnesium measured as oxides thereof.

3. The method of Claim 2 wherein the silica to alumina ratio of said Z-14 US zeolite is greater than about 3.

4. The method of Claim 2 wherein said nickel magnesium exchanged Z-14 US is prepared by:
   (a) exchanging Z-14 US zeolite with a mixture of nickel and magnesium ions in aqueous solution at a pH of about 2 to 7; and
   (b) calcining said exchanged Z-14 US at a temperature of from about 750 to 1650° F.

5. The method of Claim 1 wherein said catalyst contains up to 95 percent by weight of an inorganic oxide matrix, comprising amorphous silica-alumina hydrogel, and clay.

6. The method of Claim 1 wherein said catalyst also contains a calcined rare earth exchanged faujasite having a silica to alumina ratio greater than 3.

References Cited

UNITED STATES PATENTS

| | | | |
|---|---|---|---|
| 3,431,196 | 3/1969 | Dobres et al. | 208—111 |
| 3,425,956 | 2/1969 | Baker et al. | 252—455 Z |
| 3,640,905 | 2/1972 | Wilson | 252—455 Z |
| 3,676,368 | 7/1972 | Scherzer et al. | 252—455 Z |
| 3,686,121 | 8/1972 | Kimberlin et al. | 252—455 Z |

DELBERT E. GANTZ, Primary Examiner

G. E. SCHMITKONS, Assistant Examiner

U.S. Cl. X.R.

252—455 Z